United States Patent
Mietto

(10) Patent No.: US 9,534,600 B2
(45) Date of Patent: Jan. 3, 2017

(54) OIL SEPARATOR DEVICE FOR A VOLUMETRIC COMPRESSOR AND VOLUMETRIC COMPRESSOR

(71) Applicant: Virgilio Mietto, Creazzo (IT)

(72) Inventor: Virgilio Mietto, Creazzo (IT)

(*) Notice: Subject to any disclaimer, the term of this patent is extended or adjusted under 35 U.S.C. 154(b) by 0 days.

(21) Appl. No.: 14/426,439

(22) PCT Filed: Aug. 27, 2013

(86) PCT No.: PCT/IB2013/001862
§ 371 (c)(1),
(2) Date: Mar. 6, 2015

(87) PCT Pub. No.: WO2014/041407
PCT Pub. Date: Mar. 20, 2014

(65) Prior Publication Data
US 2015/0240817 A1      Aug. 27, 2015

(30) Foreign Application Priority Data

Sep. 11, 2012   (IT) .............................. VI2012A0227

(51) Int. Cl.
*F04C 29/02*      (2006.01)
*F04C 29/12*      (2006.01)
(Continued)

(52) U.S. Cl.
CPC .............. *F04C 29/026* (2013.01); *B01D 45/16* (2013.01); *F04B 39/16* (2013.01); *F04C 18/16* (2013.01);
(Continued)

(58) Field of Classification Search
CPC ......... B01D 45/02; B01D 45/04; B01D 45/08; B01D 45/16; F04C 29/026; F04C 29/12; F04C 18/16; F04C 29/0007; F04B 39/16
See application file for complete search history.

(56) References Cited

U.S. PATENT DOCUMENTS 1,791,668 A * 2/1931 Fox ........................ B01D 45/08
                                                          220/374
3,528,218 A * 9/1970 McDonald, Jr. ....... B01D 45/16
                                                          55/461

(Continued)

FOREIGN PATENT DOCUMENTS

DE    102011053144    3/2012
WO    WO 95/18945    7/1995

*Primary Examiner* — Jason M Greene
(74) *Attorney, Agent, or Firm* — Fattibene and Fattibene L; Paul A. Fattibene

(57) ABSTRACT

The present invention is a separator device (oil separation) (100) for a device (1) for compressing a gas through the use of a compression fluid, comprising a compression chamber (2) suited to generate a compressed mixture of the gas and the compression fluid, and a separation tank (7) for the removal of the lubricant fluid from the compressed mixture, a first tubular element (101) suited to be inserted between the compression chamber (2) and the oil separation tank (7) of the compression device (1), in such a way as to convey the mixture inside the tank (7). The device (100) comprises means for deviating and/or conveying the flow of the compressed mixture that are suited to convey the mixture against the inner walls of the first tubular element (101) before the compressed mixture flows out of the first tubular element (101). The invention also concerns a separation tank (7) for a device (1) for compressing a gas through the use of a compression fluid.

8 Claims, 5 Drawing Sheets

(51) Int. Cl.
    *F04C 29/00*     (2006.01)
    *B01D 45/16*     (2006.01)
    *F04C 18/16*     (2006.01)
    *F04B 39/16*     (2006.01)
    *B01D 45/02*     (2006.01)
    *B01D 45/08*     (2006.01)

(52) U.S. Cl.
    CPC ........... *F04C 29/0007* (2013.01); *F04C 29/12* (2013.01); *B01D 45/02* (2013.01); *B01D 45/08* (2013.01); *F04C 2240/806* (2013.01); *F04C 2240/809* (2013.01)

(56) References Cited

U.S. PATENT DOCUMENTS

| | | | | |
|---|---|---|---|---|
| 3,707,068 A * | 12/1972 | Bloom | B01D 45/16 | 55/337 |
| 3,955,945 A * | 5/1976 | Bauer | F04B 39/16 | 55/319 |
| 4,323,375 A * | 4/1982 | Chang | B01D 45/16 | 55/318 |
| 4,957,517 A | 9/1990 | Linnert | | 55/184 |
| 5,314,529 A * | 5/1994 | Tilton | B01D 45/16 | 96/204 |
| 5,318,609 A * | 6/1994 | Kittler | B01D 45/08 | 55/443 |
| 5,947,711 A * | 9/1999 | Myers | B01D 45/08 | 165/140 |
| 2003/0014951 A1* | 1/2003 | Crouse | F04C 29/026 | 55/322 |
| 2008/0115469 A1* | 5/2008 | Lane | B01D 45/06 | 55/337 |
| 2011/0182762 A1 | 7/2011 | Feller et al. | | 418/206.7 |

* cited by examiner

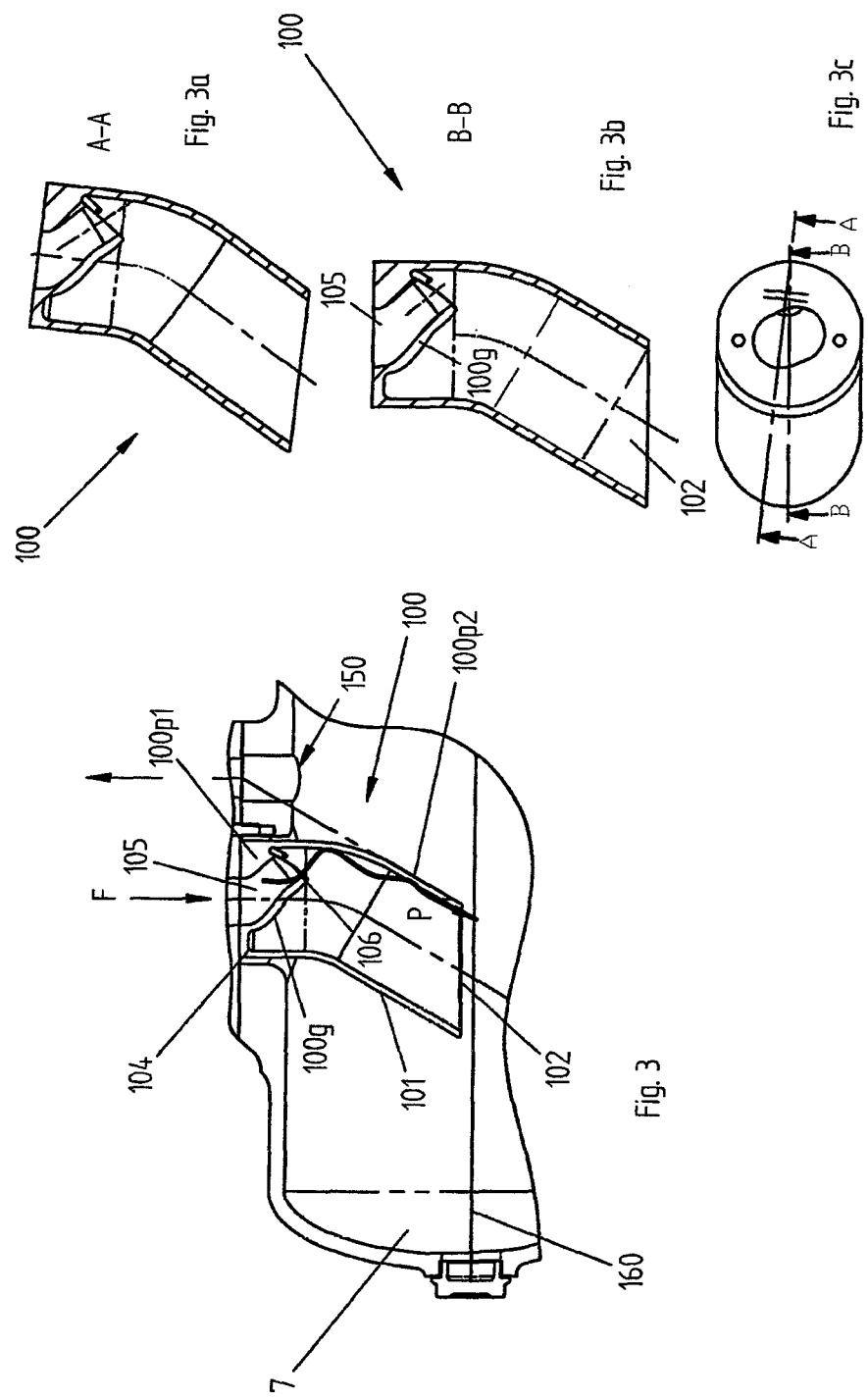

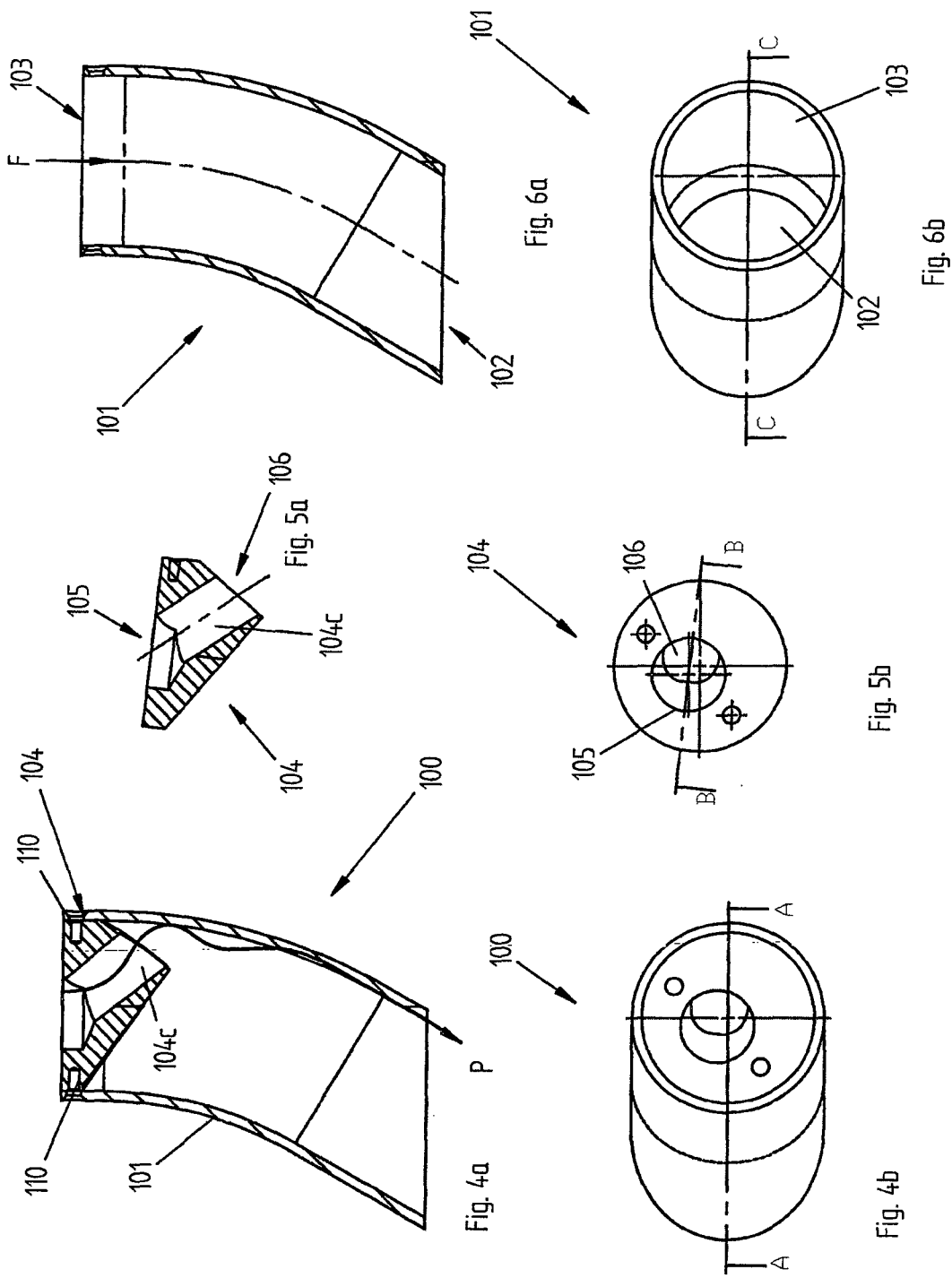

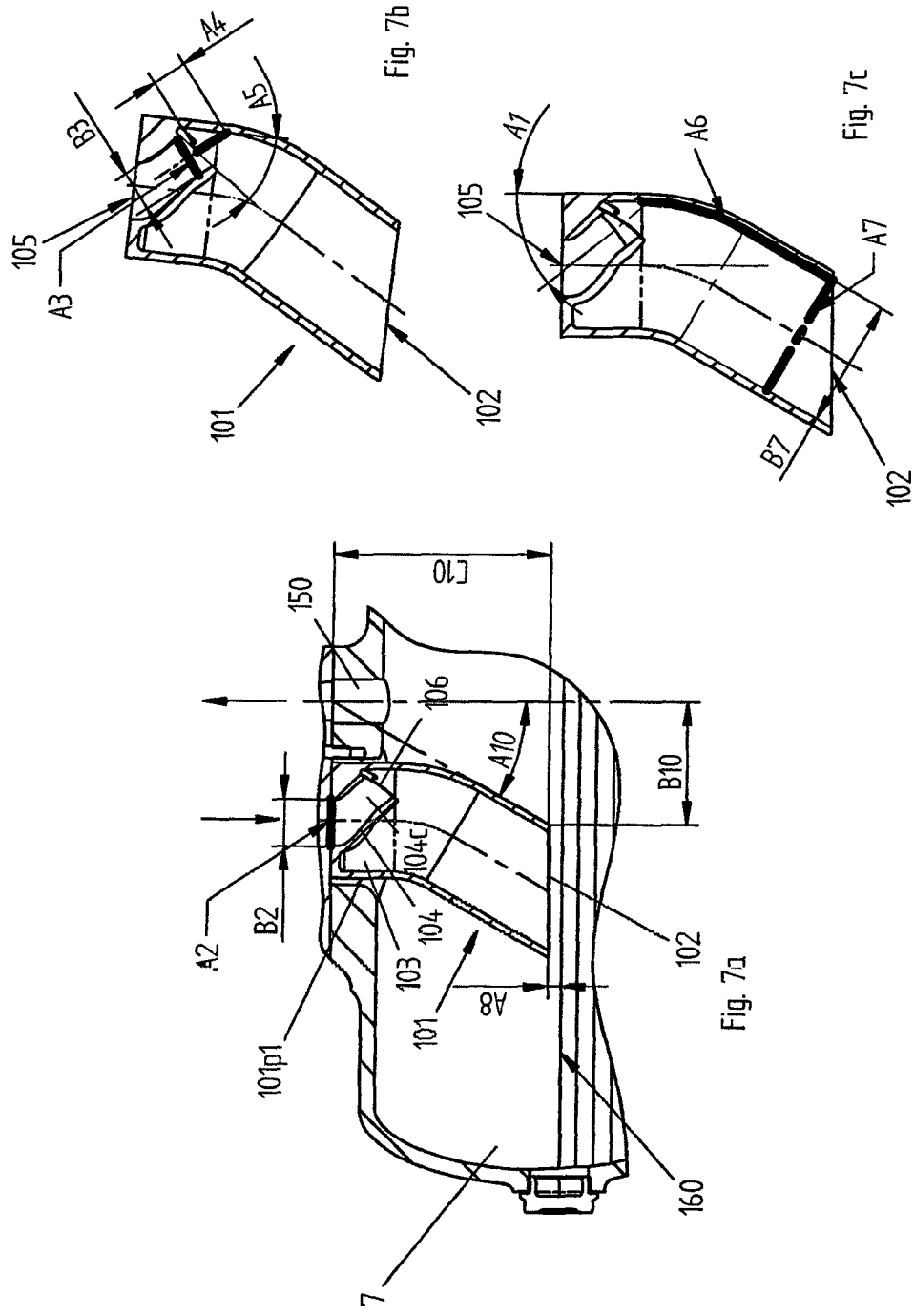

OIL SEPARATOR DEVICE FOR A VOLUMETRIC COMPRESSOR AND VOLUMETRIC COMPRESSOR

TECHNICAL FIELD OF THE INVENTION

The present invention concerns the technical sector of devices for the generation of compressed gas, preferably compressed air.

In particular, the present invention concerns the technical sector of volumetric compressors.

In greater detail, the present invention concerns an oil-injected screw volumetric compressor.

DESCRIPTION OF THE STATE OF THE ART

It is known that devices for the generation of compressed gas are used in several sectors, typically but not only in the industrial sector.

In said devices for the generation of compressed gas, here below simply referred to as compressors, a gas, typically air, is sucked and subjected to a treatment intended to increase its pressure towards an outlet way.

Among the compressors of the known type, the so-called screw volumetric compressors with injection of a lubricant fluid (oil) offer several advantages like for example high efficiency and reliability, sturdiness, limited overall dimensions etc.

Said compressors typically comprise a case that defines a compression chamber provided with two suction ducts, one for the air or gas and the other for the oil or lubricant fluid, as well as a delivery duct (outlet) for the compressed mixture of air and oil. Inside the compression chamber there are two helical rotors, a male rotor (generally the drive rotor) and a female rotor (generally the driven rotor), meshing with each other. The compression of the air and oil mixture takes place in the volume included between the gears of the two rotors and the casing, in particular between the contact area of the two rotors and the outlet duct. In particular, during the rotation of the two rotors the contact section included between the profile of the male rotor and that of the female rotor is displaced, in particular it moves towards the delivery duct. In this way, the mixture of air and oil contained between the contact section and the delivery duct is compressed.

The mixture of air and oil flowing out of the compression chamber is then subjected to a treatment for the separation of the oil from the compressed mixture.

The oil removed from the compressed mixture is then re-introduced in the chamber and/or used for other purposes.

The separation sector is thus arranged downstream of the compression chamber. According to the known technique, the separation sector typically comprises a tank. The oil particles are separated from the compressed air due to a mechanical effect. This means that the air/oil mixture flowing out of the compression chamber is guided along a pre-defined route inside the tank (created according to suitable geometric characteristics inside the tank) until it comes into contact with the inner walls of the tank, which thus hold the oil drops. The same oil drops then run down along said walls of the tank due to gravity, so that the oil accumulates on the bottom of the tank, from which it is then removed in order to be re-introduced in the compression chamber and/or re-used for other purposes. On the contrary, the compressed air accumulates in the upper portion of the tank, from which it can be taken through the delivery duct in order to be used and/or subjected to further treatments.

In particular, it is often necessary to subject the air that flows out of the tank to further filtering operations in order to remove any oil residues that have escaped the oil separation treatment performed in the tank.

The screw compressors belonging to the state of the art, however, pose some drawbacks.

A drawback posed by the volumetric compressors of the known type is due to the fact that the efficacy or efficiency of the oil separation stage (the quantity of oil removed from the mixture per time unit) is connected to the geometric characteristics of the inside of the tank; very complicated geometric characteristics defining forced routes for the flow of the air/oil mixture guarantee high efficiency but are characterized by considerable construction complexity and high costs. Therefore, compressor manufacturers tend to opt for compromise solutions characterized by sufficient or acceptable efficiency and reasonable construction complexity and production costs.

A second problem posed by the volumetric compressors according to the known art derives from the fact that the oil separation tank cannot be used for compressors of a different type, since the geometric characteristics of the inside of the tank must be defined for each type of compressor.

A further unsatisfying aspect of the compressors according to the known art is represented by the low efficiency of the oil separation tanks; this means that the air at the outlet of the tank still contains a too high percentage of lubricant fluid, so that it is necessary to subject the air flowing out of the tank to further treatments downstream of the tank itself, for the purpose of removing the residual portions of lubricant oil. For example, it is necessary to provide one or more filters that, however, involve an increase in production and maintenance costs, as the filters themselves must be periodically inspected and cleaned or even replaced.

A further drawback posed by said compressors is constituted by their overall dimensions, in particular due to the presence of the tank for the separation of the oil/air mixture.

Another drawback posed by said compressors is constituted by the pressure losses along the canalization of the oil, air and oil/air flows that reduce the global efficiency of the compressor itself.

The main object of the present invention is thus to reduce or at least partially resolve the above mentioned problems that characterize the volumetric compressors belonging to the state of the art.

In particular, it is an object of the present invention to provide an oil separator device for volumetric compressors that is characterized by a simple construction, that is interchangeable (suited to be installed on different compressors with correspondingly different tanks), has minimum overall dimensions and is characterized by high efficiency (in terms of quantity of lubricant fluid removed from the air/lubricant fluid mixture per time unit).

It is another object of the present invention to provide a screw volumetric compressor whose size and weight are reduced compared to those of the compressors of the known type.

It is a further object of the present invention to provide a screw volumetric compressor offering higher reliability than the compressors of the known type.

It is a further object of the present invention to provide a screw volumetric compressor whose production and/or maintenance times and/or costs are lower than those of the compressors of the known type.

It is a further object of the present invention to provide a screw volumetric compressor that can be easily adapted to the different power ranges and/or the different needs in terms of overall dimensions.

SUMMARY OF THE PRESENT INVENTION

The present invention is based on the general consideration that the problems found in the state of the art can be at least partially overcome through the construction of an oil separator device for devices for compressing a gas through the use of a lubricant and/or compression fluid, suited to be inserted between the compression chamber and the oil separation tank of a compression device and allowing oil separation to take place inside the oil separator device, that is, before the mixture flowing out of the compression chamber is introduced in the oil separation tank.

In this way, the oil separator device can be installed in compression devices of different types, provided with oil separation tanks of different types. The oil separator device can thus be produced and marketed independently of and separately from the compression devices and/or the oil separation tanks.

Furthermore, the efficiency of the oil separator device will depend exclusively on the shape of the device itself, while on the other hand it will be independent of the shape and/or internal geometric characteristics of the oil separation tank.

According to a first embodiment, the object of the present invention is thus a separator device (oil separation) for a device for compressing a gas through the use of a compression fluid, wherein said compression device comprises a compression chamber for the generation of a compressed mixture of said gas and said compression fluid, as well as a separation tank (oil separation) for the removal of said lubricant fluid from said compressed mixture, said device comprising a first tubular element suited to be inserted between said compression chamber and said oil separation tank of said compression device, in such a way as to convey said mixture into said tank, said device comprising means for deviating and/or conveying the flow of said compressed mixture, said means being suited to convey said mixture against the inner walls of said first tubular element before said compressed mixture flows out of said first tubular element.

In this way, the lubricant fluid (oil) suspended in the mixture flowing out of the compression chamber will accumulate on the walls of said first tubular element and from there it will run down due to gravity and accumulate on the bottom of the tank, from where it can be collected so that it can be re-introduced in the compression chamber and/or used for different and/or alternative purposes.

Advantageously, said first tubular element comprises a first inlet end that defines a first inlet opening for said compressed mixture and a second outlet end, downstream of said first inlet end, that defines an outlet opening for said compressed mixture, said deviating and/or conveying means being suited to convey said compressed mixture against the inner walls of said first tubular element, upstream of said second outlet opening.

Preferably, said first inlet end of said first tubular element is suited to be housed into an opening created in said tank.

Advantageously, said first tubular element comprises a curved intermediate portion included between said first inlet portion and said second outlet portion.

Preferably, said deviating and/or conveying means are suited to convey said compressed mixture against the inner walls of said first tubular element, at the level of said curved portion of said first tubular element.

Advantageously, said deviating and/or conveying means are suited to convey said compressed mixture against the internal walls of said first tubular element, towards the outside of the curve defined by said curved portion of said first tubular element.

Preferably, said deviating and/or conveying means comprise a second tubular element housed inside said first tubular element.

Advantageously, said second tubular element comprises a first inlet end that defines a first inlet opening for said compressed mixture and a second outlet end that defines a second outlet opening for said compressed mixture.

Preferably, said second outlet opening of said second tubular element is arranged upstream of said second outlet opening of said first tubular element along the direction F of the flow of said compressed mixture.

Advantageously, said second tubular element defines an inner channel suited to convey said compressed mixture along a transverse direction with respect to the flow direction defined by said first tubular element.

According to a further embodiment, the present invention concerns a gas compression device comprising a main body suited to define a chamber for the compression of a mixture of said gas and a lubricant fluid, said compression chamber being provided with an inlet for said gas, an inlet for said lubricant fluid and an outlet for said compressed mixture; separation means, arranged downstream of said outlet, suited to receive said mixture and suited to separate said lubricant fluid and said gas contained in said mixture, said separation means comprising a separator device (oil separation) as previously defined.

Preferably, the compression device comprises a circuit for recirculating the lubricant fluid from the tank to the compression chamber.

In an advantageous embodiment of the invention, the recirculation circuit comprises a channel for injecting the lubricant fluid into the compression chamber, wherein the injection channel is at least partially made in the main body.

A thermostatic valve is properly arranged along the lubricant fluid recirculation circuit.

According to a preferred embodiment of the invention, the thermostatic valve comprises a body made in a single piece with the main body.

Filtering means are preferably arranged along the lubricant fluid recirculation circuit for filtering said fluid.

According to a preferred embodiment of the invention, the liquid filtering means comprise a filter housed in a supporting seat made in a single piece with the main body.

Preferably, the device comprises means for injecting the gas in the compression chamber.

Advantageously, the injection means comprise a gas suction valve.

According to a preferred embodiment of the invention, the device comprises a valve body of the suction valve, wherein the valve body is made in a single piece with the main body.

The device preferably comprises conveying means arranged downstream of the separation means for conveying the gas separated from the mixture towards an oil separation filter.

According to a preferred embodiment of the invention, the conveying means comprise a gas ejection channel, wherein the ejection channel is at least partially created in the main body.

More preferably, the device comprises a viewer element for inspecting the lubricant fluid recovery channel.

According to a preferred embodiment of the invention, the compression means comprise two helical screws meshing with each other.

Advantageously, the helical screws are arranged along respective longitudinal rotation axes, substantially parallel to one another.

The liquid is preferably constituted by oil.

The gas is preferably constituted by air.

According to a further embodiment, the present invention concerns a separation tank for a device for compressing a gas through the use of a compression fluid, said compression device comprising a compression chamber for the generation of a compressed mixture of said gas and said compression fluid, said separation tank (oil separation) being suited to remove said lubricant fluid from said compressed mixture, wherein said separation tank is a separator device as previously defined.

Further embodiments of the present invention are defined in the dependent claims.

BRIEF DESCRIPTION OF THE DRAWINGS

Further advantages, objects and characteristics, as well as further embodiments of the present invention are defined in the claims and will be clarified below through the following description, which makes reference to the enclosed drawings; in the drawings, corresponding or equivalent characteristics and/or component parts of the present invention are identified by the same reference numbers. It should however be noted that the present invention is not limited to the embodiments described below and represented in the drawings; on the contrary, all those variants and/or modifications of the embodiments described below and represented in the drawings that are clear and obvious to any expert in the art fall within the scope of the present invention.

In particular, in the figures:

FIG. 3 shows a cross section of a portion of a compression tank inside which there is a separator device (oil separation) according to the present invention;

FIGS. 3a, 3b and 3c respectively show a sectional view according to a first plane, a sectional view according to a second plane and a top view of the separator device according to the present invention;

FIGS. 4a and 4b respectively show a sectional view and a top view of the separator device according to the present invention;

FIGS. 5a and 5b respectively show a sectional view and a top view of one of the two tubular elements of the separator device according to the present invention;

FIGS. 6a and 6b respectively show a sectional view and a top view of the other one of the two tubular elements of the separator device according to the present invention;

FIGS. 7a, 7b and 7c show the parameters and the construction and/or design variables of the device according to the present invention.

DETAILED DESCRIPTION OF THE PRESENT INVENTION

Figure 1:
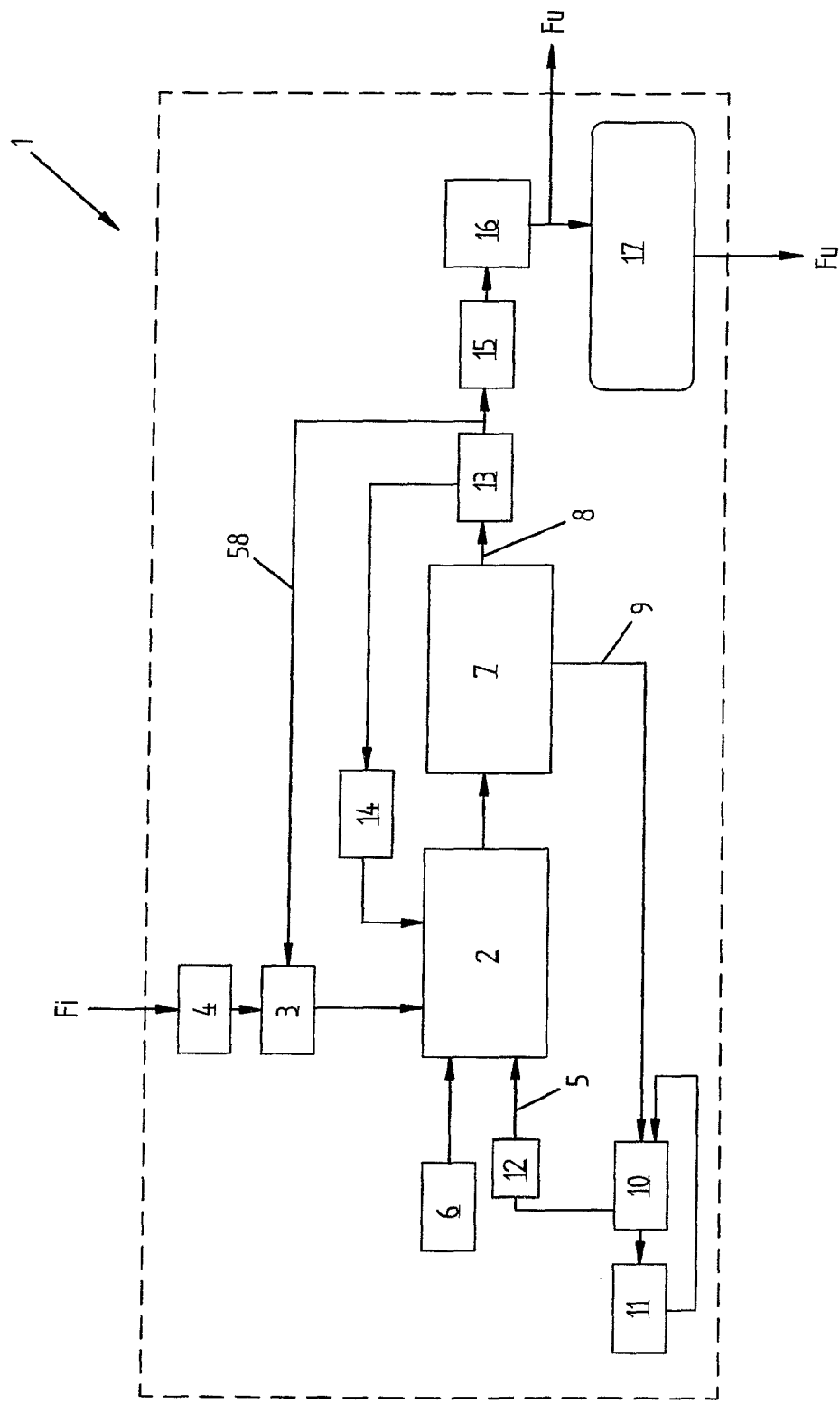
FIG. 1 shows a schematic view of the operating principle of a compressor according to a first embodiment of the invention.

Even if the present invention is described here below with reference to its embodiments represented in the drawings, the present invention is not limited to the embodiments described below and shown in the drawings. On the contrary, the embodiments described below and represented in the drawings clarify some aspects of the present invention, the scope of which is however defined in the claims.

The present invention can be applied in particular to the production of volumetric compressors used in several sectors, for example in the mining sector, the construction sector or in industry. In particular, the present invention can be especially but not exclusively applied to the production of screw volumetric compressors with injection of a lubricant fluid (oil) and powered by an electric motor.

It should however be noted that the present invention is not limited to this type of use. On the contrary, the present invention can be conveniently applied in all those cases in which a screw volumetric compressor must be used, for example to engine-driven compressors (internal combustion engine).

Embodiments of the compressor according to the present invention are described here below; in the figures, similar or equivalent characteristics and/or component parts are identified by the same reference numbers.

FIG. 1 schematically shows the operating principle of a preferred embodiment of the screw compressor with lubricant fluid injection 1 according to the present invention, here below simply referred to as compressor.

The compressor 1 substantially perform a compression treatment on an incoming gas flow Fi, typically an air flow, using a compression and/or lubricant fluid, typically oil, in order to obtain an outgoing flow of compressed gas Fu.

The oil-injected screw compressor 1 is a machine of the rotary volumetric type. It comprises a compression chamber 2 inside which the gas and the compression fluid are compressed.

The compressor 1 comprises a suction valve 3 for the gas (typically air), provided with a suitable suction filter 4, suited to convey the air into the compression chamber 2. The compressor 1 also comprises an oil feeding inlet 5 suited to convey the oil into the compression chamber 2.

Driving means 6 make it possible to activate and/or move the actual compression means housed inside the compression chamber 2. The compressor 1 also comprises a separation section (or tank) 7 arranged downstream of the compression chamber 2, into which the compressed oil/air mixture is conveyed through a delivery duct or channel (here below simply referred to as delivery duct), so that it is separated and so as to obtain, at the outlet, compressed air 8 on one side and oil 9 on the other.

The separated oil 9 is recovered in order to re-introduce it in the compression chamber 2 through said feeding inlet 5. The re-introduction of said oil 9 in the compression chamber 2 can occur only after a previous passage through a thermostatic valve 10 that allows the oil 9 to flow towards the feeding inlet 5 only on condition that its temperature is lower than a pre-established limit temperature. In fact, the oil 9 present in the compression chamber 2 is subjected to an increase in temperature. Therefore, the thermostatic valve 10 allows only the passage of oil at the correct temperature, while the oil at higher temperature is conveyed to an oil cooler 11 that cools it down before it is re-introduced in the recirculation circuit.

Upstream of the oil feeding inlet 5 there is preferably a filter 12 for the elimination of any impurities.

Regarding the separated compressed air 8, it is first conveyed towards an oil separation filter 13 that separates any oil residues present in the compressed air.

The recovered residual oil is re-introduced in the compression chamber 2. An oil recovery viewing element 14, which allows the oil to be monitored, is preferably positioned along the recovered oil re-introduction circuit.

The purified compressed air at the outlet of the oil separation filter 13 passes through a minimum pressure valve 15. Said valve 15 allows the air to pass through it only once the pre-defined rated pressure has been reached.

The air flowing out of the minimum pressure valve is preferably conveyed into a cooler 16 where it cools down. The cooled air Fu is then sent to a usage tank 17, or alternatively directly to the user.

Part of the purified compressed air flowing out of the oil separation filter 13 is conveyed to the suction valve 3 through an apposite channel 58. The air conveyed through said channel 58 represents the feedback signal that tells the suction valve when the air passage must be closed or opened. In particular, if the air pressure in said channel 58 is lower than the pre-defined rated pressure of the compressor 1, the suction valve 3 is opened. If, on the other hand, the air pressure in said channel 58 is higher than or the same as the pre-defined rated pressure of the compressor, the suction valve 3 is closed.

Further elements, not specifically indicated, are preferably provided for the compressor 1, like for example valves for discharging the oil from the separation section 7, if necessary, or safety valves, or valves for discharging the condensate present in the air tank 17, etc.

Figure 2:
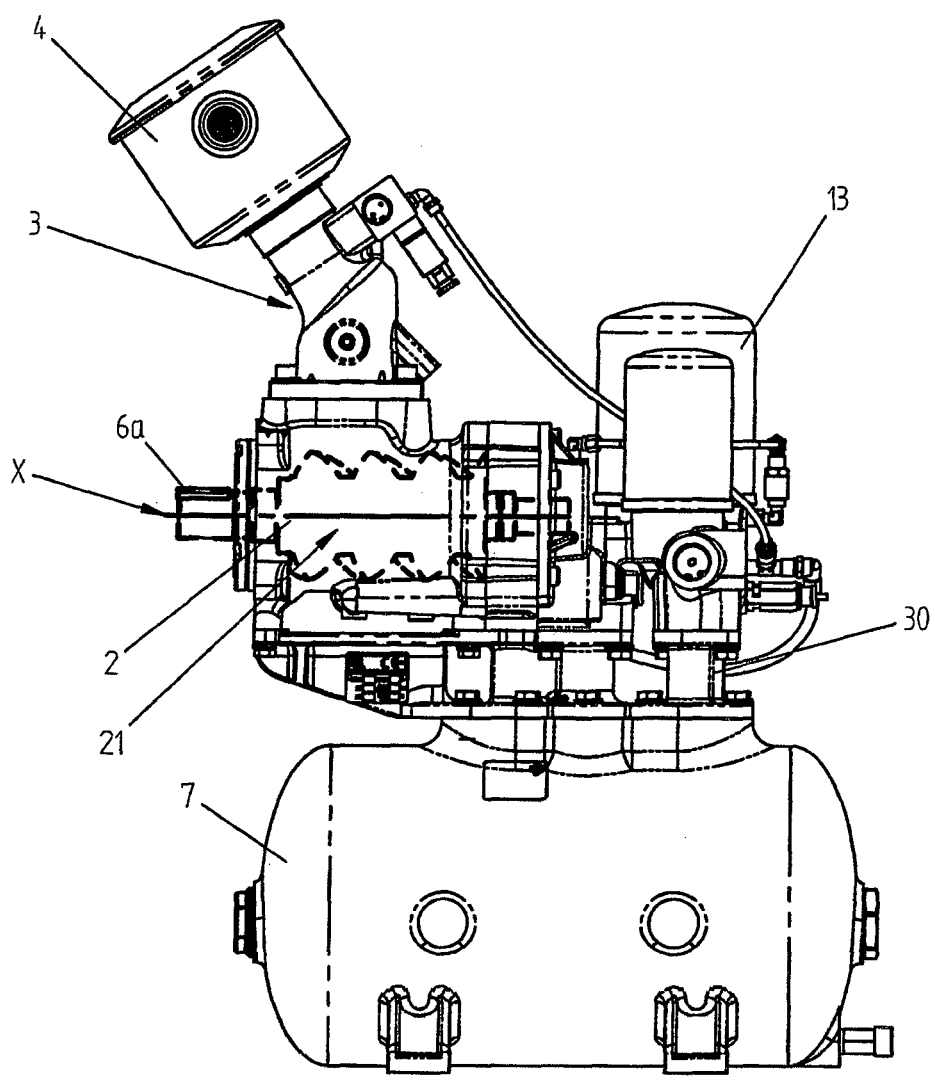
FIG. 2 shows a partially sectional side view of a compressor according to said first embodiment of the invention.

In FIG. 2 it is possible to observe the configuration and mutual arrangement of the main component parts of the compressor 1. In fact, in FIG. 2 it is possible to recognize the air filter 4, the compression chamber 2, the shaft or pinion 6a for connection of the means 6 for moving the compression means, the oil separation filter 13, the main body 30, and the separation tank 7.

The compression chamber 2 is thus defined inside the main body 30 preferably obtained through a die casting process, preferably through a metallic material casting process. The metallic material preferably comprises aluminium. In construction variants of the invention, the main body 30 can be advantageously obtained by sand moulding of a cast iron alloy.

Inside the compression chamber 2 there are the compression means (represented with broken lines) of the air/fluid mixture.

The methods for compressing the mixture are known per se, so that their detailed description is omitted.

On the other hand, it should be briefly specified that the compression means comprise two helical rotors, a male rotor (generally the drive rotor) and a female rotor (generally the driven rotor), meshing with each other. The compression of the gas/oil mixture takes place in the volume included between the gears of the two rotors and the body that defines the compression chamber 2; during rotation, the contact section included between the profile of the male rotor and that of the female rotor is displaced starting from a suction side towards a delivery side, so that the quantity of air included therein is compressed due to the reduction of the volume at its disposal.

Said first and second rotor are arranged longitudinally, along a main axis X, and thus substantially parallel to each other, and rotate on respective rotation axes substantially parallel to the main axis X of the compression chamber 2.

The driving means 6 preferably comprise an electric motor directly connected to the end 6a of the first rotor 21.

In variant embodiments of the invention the driving means can be of a different type, like for example a combustion engine, and they may also include an indirect, remote connection to a motor, for example through the interposition of a transmission belt or gears.

On top of the main body 30 there is the air suction valve 3 with the corresponding filter 4.

The air suction valve 3 communicates with the compression chamber 2 through a special air suction channel (not illustrated in the figures). Said air suction channel is preferably made in the main body 30.

Regarding the oil supply to the compression chamber 2, this is obtained through a recirculation circuit that takes the oil from the bottom of the tank 7 in order to re-introduce it in the compression chamber 2.

The oil present on the bottom of the tank 7 is collected due to the effect of the pressure inside the tank 7, through a drawing pipe (not illustrated in the figures), and then conveyed to the thermostatic valve 10.

If the oil temperature is correct, that is, below a limit temperature, the thermostatic valve 10 directs the oil flow directly to the oil filter 12 and from there to the compression chamber 2. On the other hand, if the oil temperature exceeds the limit temperature, the thermostatic valve 10 directs the oil flow towards a cooler, not illustrated herein, through a duct connected to an apposite outlet.

The oil cooled by the cooler flows back upstream of the thermostatic valve 10 through a duct connected to an apposite inlet.

As is known, in oil-injected screw compressors the oil serves also to lubricate some parts of the compressor itself. In particular, lubrication is needed for the sliding elements, or bearings, that support the compression rotors. For this purpose, the oil in the system is also properly channeled so that it reaches those parts.

According to the present invention, the extraction of the oil from the mixture is performed through an oil separator device that will be described in detail here below with reference to FIGS. 3a, 3b and 3c.

In particular, in FIGS. 3a, 3b and 3c, the separator device or oil separator device 100 is represented in its position with respect to the separation tank 7 (FIG. 3), that is, at least partially inside said separation tank 7, and in such a way as to provide a connection between the compression chamber (not illustrated in FIG. 3) and the tank itself, so that said compressed mixture flowing out of the compression chamber is conveyed into the device 100 through the delivery duct and from there into the tank 7. It can also be noted that the device 100 comprises at least one first portion 100p1 housed in an opening provided in the wall of the tank 7, and a second portion 100p2 adjacent to said first portion 100p1 (downstream of said first portion 100p1 in the direction F of the flow of the compressed mixture) and housed inside the tank 7 itself. The operation of the device 100 can be briefly summed up as follows.

The compressed mixture flowing out of the compression chamber enters the device 100 through the delivery duct that conveys it into an inlet opening 105 of the device itself. The compressed mixture is then deviated inside the device through the geometric shapes 100g and forced by these to follow a forced route P. Furthermore, said forced route P is such that the compressed mixture hits the inner wall of the device 100 before flowing out of the device through its outlet opening 102 and definitively enters the tank 7. It is thanks to the impact of the compressed mixture against the inner wall of the device 100 that the compression fluid is separated from the mixture (oil separation in the case of compression oil). The compression fluid suspended in the mixture "condensates" on the inner wall of the device 100 and from there it drops or runs down due to gravity (from top to bottom in FIG. 3) inside the tank 7.

The compression fluid that accumulates on the bottom of the tank until reaching the level 160 indicated in FIG. 3 can thus be collected and re-introduced in the compression chamber or re-used for different and/or alternative purposes.

Furthermore, the separated compressed air 8 is located in the upper portion of the tank. The compressed air is collected from said upper portion through an ejection channel 150 in order to be conveyed to the oil separation filter 13.

It can thus be understood that the device 100 just described above allows the set objects to be achieved.

In fact, the efficiency in terms of separation will depend exclusively on the configuration, proportions and size of the device, while it will be independent of the configuration, proportions and size of the tank 7. Therefore, the device will be interchangeable and it will be possible to install it on tanks of different types. Furthermore, experimental tests have shown that by properly choosing the configuration, size and proportions of the device it is possible to obtain extremely satisfying efficiency levels, with negligible residues of compression fluid in the gas flowing out of the tank 7.

FIGS. 4a, 4b, 5a, 5b, 6a and 6b show a preferred embodiment of the device according to the present invention. In particular, with reference to said figures it can be noted that the device 100 comprises a first hollow tubular element 101 provided with an inlet opening 103 and an outlet opening 102. The portion of the tubular element 101 in proximity to its inlet opening 103 is suited to be housed in a corresponding seat obtained in the wall of the separation tank 7. The tubular element 101 also comprises a second portion adjacent to said first portion (downstream of the same in the direction F of the flow) that extends from said first portion to the outlet opening 102 of the tubular element 101. Said second portion of the tubular element 101, with the device 100 in its final operating position inside the tank 7 (see FIG. 3) extends at least partially inside the tank 7.

The device 100 also comprises a second hollow tubular element 104 suited to be housed inside the first tubular element 101, in particular at the level of the inlet opening 103 of said first tubular element 101. Also the second tubular element 104 comprises an inlet opening 105 and an outlet opening 106, wherein in the mutual position of said first and second tubular elements shown in FIG. 5a said inlet opening 105 is arranged inside the inlet opening 103 of the first tubular element. Regarding, on the other hand, the outlet opening 106 of the second tubular element 104, the same will be arranged inside the tubular element 101, upstream of the outlet opening 102 of said first tubular element 101.

As previously mentioned, the particular configuration of said first and second tubular elements 101 and 104 causes the compressed mixture to be deviated inside the device 100 through the geometric shapes 100g (in the case of this embodiment of the second tubular element 104) and forced by the latter to follow a forced route P. Said forced route P, furthermore, is such that the compressed mixture hits the inner wall of the first tubular element 101 of the device 100 before the same flows out of the device 100 through the outlet opening 102 of the first tubular element 101 and definitively enters the tank 7. It is thanks to the impact of the compressed mixture against the inner wall of the tubular element 101 that the compression fluid is separated from the mixture (oil separation in the case of compression oil).

It has been explained above that the efficiency of the separator device according to the present invention consi- erably depends on the configuration and mutual arrangement of its component parts, as well as on their size and proportions.

In particular, the embodiment shown in the figures, in which the first tubular element 101 has a curved portion and the second tubular element defines an inner channel 104c oriented crosswise with respect to the curved longitudinal axis of the first tubular element, in such a way as to direct the compressed mixture until it hits the inside of the wall of the element 101 outside the curve, has given the best results.

Other parameters to be taken into account in order to improve and/or optimize the efficiency of the device 100 are shown in FIGS. from 7a to 7c and also listed here below, while the dimensional intervals of said parameters are indicated in the following table, in which in particular:

D stands for the diameter of the delivery duct (connection duct between the compression chamber and the device 100);

A stands for the surface area of the delivery duct;

A1 stands for the angle between the longitudinal axis of symmetry of the second tubular element 104 and the longitudinal axis of symmetry of the first portion 100p1 of the device 100;

A2 stands for the surface area of the opening 105 in the second tubular element 104;

B2 stands for the diameter of the opening 105 of the second tubular element 104;

A3 stands for the surface area of the opening 106 in the second tubular element 104;

B3 stands for the diameter of the opening 106 of the second tubular element 104;

A4 stands for the distance between the end portion coming out of the second tubular element 104 and the inner wall of the first tubular element 101 (measured along the directrix of the mixture of gas and compression fluid);

A5 stands for the angle between the inner wall of the first tubular element 101 and the plane on which the edge of the outlet end of the second tubular element 104 lies;

A6 stands for the length of the portion of the inner wall of the first tubular element 101 that comes into contact with the mixture flowing out of the second tubular element 104;

A7 stands for the surface area of the outlet opening 102 of the first tubular element 101 (perpendicularly to the longitudinal axis of symmetry of the portion 100p2);

B7 stands for the diameter of the outlet opening 102 of the first tubular element 101;

A8 stands for the distance between the oil level 160 in the tank and the end portion 100p2 of the first tubular element 101;

A10 stands for the angle between the end portion 100p2 of the first tubular element 101 and the longitudinal axis of the discharge channel 150;

B10 stands for the distance between the end portion 100p2 of the first tubular element 101 and the longitudinal axis of symmetry of the discharge channel 150;

C10 stands for the distance between the oil level 160 and the end 100p1 of the first tubular element 101.

Preferred Values

| | Size | Interval |
|---|---|---|
| D | [mm] | 24-120 |
| A | [mm2] | 450-11.300 |
| A1 | ° | 45° ± 15° |

-continued

|     | Size   | Interval            |
| --- | ------ | ------------------- |
| A2  | [mm2]  | 0.2-0.8 × A         |
| B2  | [mm]   | (0.45-0.9) D        |
| A3  | [mm2]  | A2 ± 20%            |
| B3  | [mm]   | ±10% B2             |
| A4  | [mm]   | 0.5-1.2 × B2        |
| A5  | °      | 30° ± 15%           |
| A6  | [mm]   | ≥4 × B2             |
| A7  | [mm2]  | ≥4 × A2             |
| B7  | [mm]   | ≥2 B2               |
| A8  | [mm]   | ≥5 mm               |
| A10 | °      | 0-60°               |
| B10 | [mm]   | C10 × tan(A10)      |
| C10 | [mm]   | Dtank − (A8 + oil level) |

It should however be specified that the parameters indicated in the list shown above (whose values are given in the table) can be selected and implemented in an independent manner; this means that all the embodiments that can be obtained by combining one or more parameters together belong to the present invention.

As explained above, the separated compressed air 8 is located in the upper portion of the tank. The compressed air is collected from said upper portion through an ejection channel in order to be conveyed to the oil separation filter 13. Said filter 13 allows the compressed air to be purified through the elimination of the residual oil left after the separation.

The oil separation filter 13 comprises a first outlet for the purified compressed air and a second outlet for the oil recovered through the filtering operation.

The description provided above thus shows that the oil separator device according to the present invention makes it possible to achieve the set objects and in particular makes it possible to obtain optimal efficiency in terms of portions of compression fluid removed or separated from the compressed mixture.

Furthermore, the device according to the present invention can be applied to different compressors with different tanks, and can thus be produced and manufactured independently and according to independent and specific operating stages.

Although the present invention has been described with reference to the special embodiments shown in the figures, it should be noted that the present invention is not limited to the particular embodiments represented and illustrated herein; on the contrary, further variants of the embodiments described herein fall within the scope of the present invention, which is defined in the claims.

The invention claimed is:

1. Separator device for a device for compressing a gas through the use of a compressed mixture of said gas and of a compression fluid, comprising a first tubular element comprising an inlet end that defines an inlet opening for said compressed mixture and an outlet end arranged downstream of said inlet end which defines an outlet opening for said compressed mixture and an intermediate curved portion between said inlet end and said outlet end; said device further comprising deviating and/or conveying means suited to deviate the flow of said compressed mixture and to convey said mixture against the inner wall of said first tubular element, upstream of said outlet opening, before said compressed mixture flows out of said first tubular element; wherein said deviating and/or conveying means comprises a second tubular element housed inside said first tubular element suited to convey said compressed mixture against the inner wall of said first tubular element towards the outside of the curve defined by said curved portion of said first tubular element.

2. Separator device according to claim 1, wherein said second tubular element comprises a first inlet end that defines a first inlet opening for said compressed mixture along with a second outlet end that defines a second outlet opening for said compressed mixture.

3. Separator device according to claim 2, wherein said second outlet opening of said second tubular element is arranged upstream of said second outlet opening of said first tubular element along the direction of the flow of said compressed mixture.

4. Separator device according to claim 1, wherein said second tubular element defines an internal channel suited to convey said compressed mixture along a transverse direction with respect to the direction of flow defined by said first tubular element.

5. Compression device for compressing a gas, comprising: a main body suited to define a compression chamber for compressing a mixture of said gas and a lubricant fluid, said compression chamber being provided with an inlet for said gas, an inlet for said lubricant fluid and an outlet for said compressed mixture; separation means arranged downstream of said outlet and suited to receive said mixture and to separate said lubricant fluid and said gas contained in said mixture, wherein said separation means comprise a separator device according to claim 1.

6. Compression device according to claim 5, wherein said separation device is inserted between the compression chamber and a separation tank of said compression device.

7. Separation tank for a compression device for compressing a gas through the use of a compression fluid, said compression device comprising a compression chamber for generating a compressed mixture of said gas and said compression fluid, said separation tank being suited to remove said compression fluid from said compressed mixture, wherein a separator device according to claim 1 is at least partially housed inside said separation tank.

8. A separator device placed between a compressor chamber and a separation tank for removing a fluid from a compressed gas comprising:
   a curved tubular element having a first portion with a first longitudinal axis and a first inlet opening and a second portion with a second longitudinal axis and a first outlet opening, said curved tubular element having an inner wall with an outer curved portion; and
   a tubular element having a third longitudinal axis and a second inlet opening and a second outlet opening, said tubular element placed within the first portion of said curved tubular element with the first longitudinal axis traversing the third longitudinal axis and the second inlet opening positioned and adapted to receive the compressed gas and the fluid from the compressor chamber and the second outlet opening of said tubular element positioned adjacent and directed towards the outer curved portion of the inner wall of said curved tubular element,
   whereby the compressed gas and the fluid from the compressor chamber are capable of passing through the tubular element along the third longitudinal axis and upon exiting the second outlet opening contacting the outer curved portion of the inner wall of said curved tubular element causing the fluid to be separated from the compressed gas.

* * * * *